Sept. 8, 1931.   R. O. HENDRICKSON ET AL   1,822,093

TRACTOR

Filed March 31, 1930

Inventors
ROBERT O. HENDRICKSON
TOLMAR NELSON,
By James A. Walsh
Attorney

Patented Sept. 8, 1931

1,822,093

UNITED STATES PATENT OFFICE

ROBERT O. HENDRICKSON AND TOLMAR NELSON, OF RACINE, WISCONSIN, ASSIGNORS TO J. I. CASE COMPANY, OF RACINE, WISCONSIN, A CORPORATION

TRACTOR

Application filed March 31, 1930. Serial No. 440,488.

Our invention relates to improvements in tractors, and particularly to the axles thereof, our object being to provide means whereby the tread of the rear wheels may be extended or decreased in the cultivation and planting of crop rows so that the tractor may be adapted to travel through rows at different distances apart, and which adjustment of the wheels we are enabled to readily accomplish in a comparatively simple manner, as will further appear.

Figure 1:
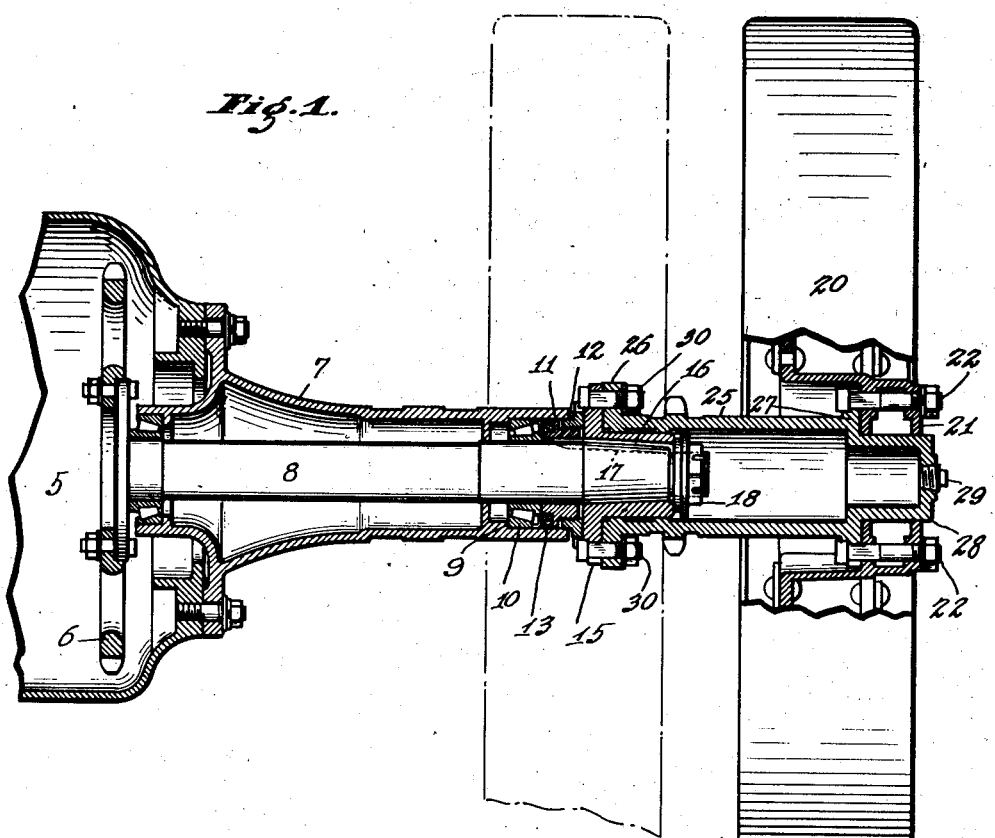
Figure 2:
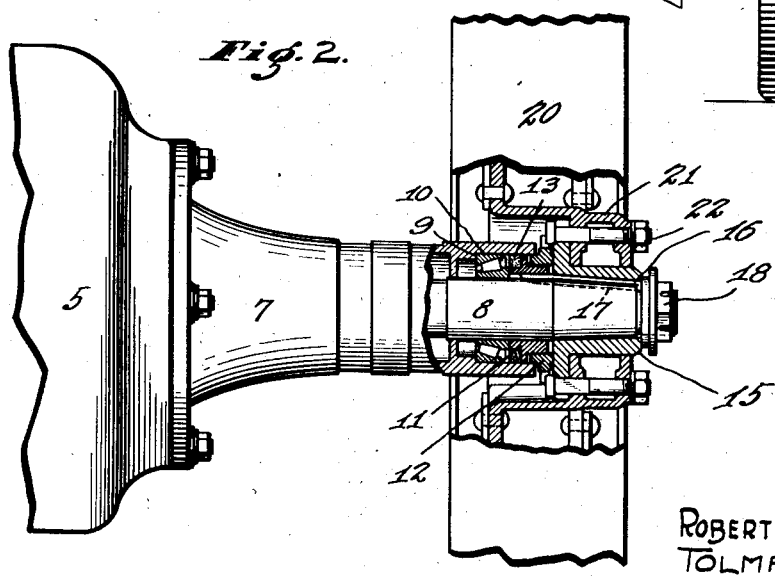

In the accompanying drawings, forming part hereof, Figure 1 is an elevation of a rear axle section and wheel including our improved means for laterally extending the wheel from the position indicated in dotted lines; and Fig. 2 is a similar view showing the wheel in normal or standard position.

In said drawings the numeral 5 indicates the body of a tractor, 6 a chain driving sprocket, 7 the axle housing, and 8 the axle section, all of which parts may be of any desired construction and arrangement.

The housing 7 preferably embodies an internal shoulder 9 against which a taper roller bearing 10 is installed and held by an externally flanged and threaded collar 11, a nut 12 engaging the threaded portion so that the collar may be adjusted in relation to the roller bearing, a suitable packing 13 being inserted between the bearing and the flange of collar 11. The outer end of the axle 8 may be tapered, as indicated, and we mount thereon a hub extension 15 which with the collar 11 is non-rotatably secured thereto by a key 16 inserted in ways 17 provided in the axle, the extension 15 and collar 11, said key-way being indicated by dotted lines, these parts, as clearly shown in Fig. 2, being securely held in fixed assembled relation by a nut 18. The wheel 20, embodying a hub 21, is then mounted upon the end of the axle, and when the hub has been brought into contact with the hub extension 15 the hub is secured to the latter by the bolts 22, and the assemblage of the axle and wheel thus completed so that the wheel will be positioned for a predetermined tread.

As indicated, it becomes necessary to widen the tread of the tractor wheels according to crop row conditions, and this we readily accomplish by removing the wheel 20 and mounting a spacer member on the hub extension 15, as indicated in Fig. 1, which spacer embodies the cylindrical body 25, the inner flange 26, outer flange 27, and reduced wheel support or spindle 28, the end of the latter being provided with a screw plug 29. In thus providing for extending the tread of the wheel it will be noted, by reference to Fig. 1, that the assembly of the hub extension 15 and the adjusting and bearing parts associated therewith remain intact and undisturbed, and to complete the extension of the axle it is but necessary to secure the inner flange 26 of the spacer to the extension flange 15 by the bolts 30, then mount the wheel 20 upon the spindle 28 and secure its hub 21 to the outer flange 27 of the spacer by bolts 22, whereupon the axle, the hub extension 15, spacer 25 and wheel 20 will become a fixed unitary structure rotating with the axle.

In Fig. 1 it will be noted that the spacer 25 is of a predetermined length, but it will be understood that these spacers may be of varying lengths to enable the tractor operator to make the tread extension according to crop row conditions to permit the rear wheels to properly traverse in rows arranged at different distances apart, so that in the simple manner stated different tread widths may be provided; and it will be understood that according to requirements of different localities and customs crop rows are made at varying distances apart, so that by supplying my improved hub extension in various lengths the desired size may be carried by dealers as a staple article readily available upon demand.

We claim as our invention:

1. In a tractor, a housing, an axle in the housing, a hub extension on the axle, a spacer, means for securing the spacer to the hub extension, a spindle on said spacer, a wheel having a hub mountable on said spindle, and means for securing the wheel-hub to the spindle.

2. In a tractor, an axle, a hub extension on the axle, a spacing member having a flange, means for securing said flange to the hub extension, an outer flange on said spacing member, a spindle extending from said outer flange and adapted to receive a wheel-hub, and means for securing a wheel-hub to said outer flange.

3. In a tractor, an axle, a hub extension on the axle, a spacing member on the extension, means for securing the hub-extension and spacing member together, a wheel-hub on the outer end of the spacing member, means for securing the wheel-hub to the spacing member, and means for non-rotatably securing the axle and hub extension together whereby said parts, the spacing member and wheel-hub will rotate as a unit.

In testimony whereof we affix our signatures.

ROBERT O. HENDRICKSON.
TOLMAR NELSON.